Oct. 4, 1966  V. O. NICOLAI  3,277,392
ADJUSTABLE FEEDBACK LASER MODULATOR
Filed Sept. 4, 1962
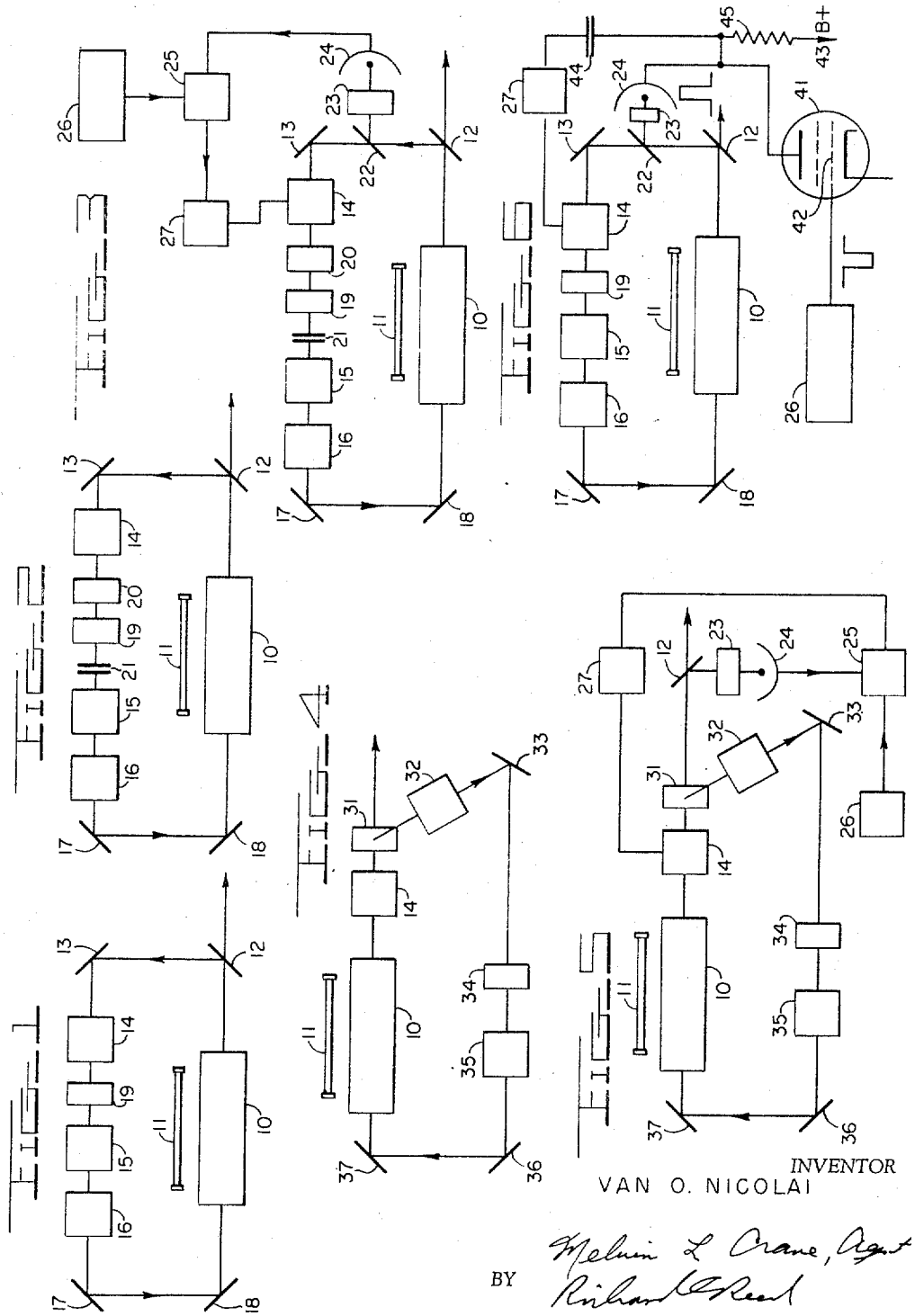
INVENTOR
VAN O. NICOLAI
BY Melvin L. Crane, Agent
Richard G. Reed
ATTORNEY

United States Patent Office 3,277,392
Patented Oct. 4, 1966

3,277,392
ADJUSTABLE FEEDBACK LASER MODULATOR
Van O. Nicolai, 275 S. Marengo, Pasadena, Calif.
Filed Sept. 4, 1962, Ser. No. 221,390
7 Claims. (Cl. 331—94.5)

The invention described herein may be manufactured and used by or for the Government of the United States of America for governmental purposes without the payment of any royalties thereon or therefor.

The present invention relates to systems which make use of a laser and more particularly to a feedback laser amplifier for generating variable duration optical pulses.

A laser (light amplification by stimulated emission of radiation) sometimes referred to as optical maser, is a device capable of producing coherent radiation in the visible and infrared regions of the spectrum. A laser is a sensitive element comprising activator ions in a suitable matrix which in operation absorbs optical energy which pumps electrons from a ground state to a higher energy level, populating the higher energy level with electrons. The electrons in the higher energy level are unstable and quickly begin to return to another state such as the ground state. In the process of returning to the ground state, the electrons fall from the metastable or excited state to the ground or terminal state yielding normal luminescence. However, if the population of the excited state exceeds that of the terminal state, then stimulated emission of radiation can occur. Further stimulated emission of radiation takes place with a regenerative buildup in intensity. The further stimulated emission is always in phase with the exciting radiation. The laser element operates as a resonant cavity and only those modes of oscillation which are the natural modes for the system can be built-up to enhance coherent radiation.

The resonator currently used in laser work is of conventional Fabry-Perot construction in which the sensitive element is a rod having its ends quite flat and parallel and coated with a film of silver for reflecting and trapping the radiation. The silver coating on one end is opaque and on the other or outlet end the silver coating is thinner to provide a small amount of light transmission as the output of the laser. Optical pumping energy is provided along the length of the laser rod by use of a suitable high intensity source for example, a xenon flash tube or mercury discharge.

It is therefore an object of the present invention to provide a laser system in which the ends of the laser element are not silvered.

Another object of the present invention is to provide suitable control of the output of the laser by use of a controlled feedback system in order to eliminate unwanted spiking thereby permitting pulse durations of desirable lengths.

Still another object of the invention is to reduce scattering effects in a laser.

While still another object of the invention is to provide a laser system in which the major portion of the light passes through the laser only once.

A further object is to provide a single modulation control of a laser.

Yet another object is to provide a system which will produce different pulse amplitudes and different pulse durations which can be controlled.

Other objects and advantages of the invention will hereinafter become more fully apparent from the following description of a drawing, which illustrates the preferred embodiments, and wherein:

FIG. 1 illustrates in block diagram a light amplification system including a laser with a suitable feedback system;

FIG. 2 illustrates a modification of the system illustrated in FIG. 1,

FIG. 3 illustrates a laser output and feedback system as shown in FIG. 1 which includes a control circuit for the feedback;

FIG. 4 illustrates an alternate laser-feedback system;

FIG. 5 illustrates the laser-feedback system as shown in FIG. 4 which includes a control circuit for the feedback; and FIG. 6 illustrates a laser-feedback system as shown in FIG. 1 with a schematic drawing of one control system suitable for the feedback.

The present invention is directed to a light amplification system which includes a laser which is optically pumped by a light source to produce an output pulse and a feedback system for controlling the output. The greater percentage of the output light pulse is then directed through an appropriate optical focusing system which focuses the light to a narrow beam which may be used in welding, as a communication system, and other uses well known in the art. The system is provided with a light feedback system for reflecting a portion of the beam back through the length of the laser by suitable optical means and an electrical control circuit is associated with the light feedback system to control the pulse amplitude and pulse duration of the laser output pulse.

Now referring to the drawing, there is illustrated in FIG. 1 a light amplification system including a laser 10 such as a single ruby cylinder or any other suitable laser element which will produce a suitable output. The laser element is optically pumped by a suitable light source 11 such as a xenon flash tube or mercury discharge lamp in order to produce a suitable light output pulse. The light output pulse of the laser is directed onto a partially reflecting mirror 12 set at a 45° angle which transmits about 90% of the incident light and reflects about 10% of the incident light at a 90° angle relative to the transmitted beam. The transmitted light is directed on through a suitable optical lens focusing system not shown for simplification of the drawings. The reflected light is directed onto a fully reflecting mirror 13 at a 45° angle with respect to the light path to reflect the light through a 90° angle into a Kerr cell 14. The effect on the light passing through the Kerr cell depends on the voltage applied thereto in the manner well known in the art. The light after passing through the Kerr cell is passed through a clockwise 45° Faraday rotator 19, a polarizer 15 having a polarization direction at 45° to the incoming light beam, and then through a counter-clockwise 45° plane of polarization Faraday rotator 16 on to a fully reflecting mirror 17 set at an angle of 45° with respect to the light beam through 90° with respect to the light path. The light is reflected by mirror 17 onto another fully reflecting mirror 18 set at an angle of 45° with respect to the incident light to reflect the light at an angle of 90° with respect to the incident beam. The light is reflected from mirror 18 into the input end of the laser 10 which amplifies the light many times on passing therethrough wherein the output pulse of the laser then follows the same paths as set forth above and shown by illustration in FIG. 1.

FIG. 2 illustrates a modification of the system shown in FIG. 1 and includes a Fabry Perot cavity 21 positioned within the system between the polarizer 15 and the clockwise Faraday rotator 19 which acts as a tank circuit to provide some amplitude stability and mode selection. Under certain conditions the Fabry Perot cavity is useful in delaying the light reflected through the system whereas under other conditions the delay is not desired.

An advantage may result from providing a suitable control of the output amplitude. With proper adjustment of feedback parameters and with appropriate voltage changes on the Kerr Cell, many different pulse amplitudes and pulse durations may be produced. Such a control is added into the system of FIG. 1 and shown by illustration in FIG. 3. As shown the light reflected by partially reflecting mirror 12 positioned in the path of the output pulse is directed onto a partially reflecting mirror 22 positioned in the light path between mirrors 12 and 13. Mirror 22 reflects only a small percentage of the incident light through a variable light attenuator 23 onto the photocathode of a phototube 24 which converts the incident light into an electrical output signal. The electrical output of the phototube is a square wave and is directed into a comparator 25 where the signal is compared with a variable square wave signal generated by an adjustable multivibrator 26. The difference in the square wave signal, if any, from the comparator 25 is directed into an amplifier 27 where the signal is amplified and then carried to the Kerr Cell. Thus the phototube and multivibrator signals operate as a servosystem error signal for the Kerr Cell. Any change of the applied voltage to the Kerr Cell effects the amount of light transmitted back to the laser. Thus the amplitude and duration of the laser output pulse can be controlled by adjusting the amplitude and duration of the multivibrator pulse which, accordingly, affects the voltage applied to the Kerr Cell to control the amount of light passing through the Kerr Cell back to the laser. Thus the output pulse of the laser is controlled in both amplitude and duration.

The output pulse of the laser is controlled by the feedback circuit illustrated in combination with the laser. In the system as shown by illustration in FIG. 1, the voltage on the Kerr Cell is controlled in the usual manner. When there is no applied voltage on the plates of the Kerr Cell no light passes through to the laser. Application of a voltage permits the light to pass in a counterclockwise direction through the shown system to the laser. The polarized output light pulse from the laser material is prevented from travelling in a clockwise direction by the 45° rotator 16 and the polarizer 15. Thus the light shown in FIGS. 1, 2, and 3 can travel in only the counter clockwise direction as controlled by the Kerr Cell. The system as shown by illustration in FIG. 3 provides an automatic control system since the outputs of a variable multivibrator and the phototube are compared and perform as a servo control system for the voltage applied to the Kerr Cell. By use of the control system to the Kerr Cell, the amplitude and duration of the output laser pulse can be determined as desired and spiking will be eliminated.

FIG. 4 is directed to an alternate system for the light feedback to the laser. The system as shown includes a laser 10 in which the output is directed into a Kerr Cell 14 and then through a polarizer 31 which passes the majority of the main beam onto a suitable optical lens system not shown and a small portion of the light beam is directed through a clockwise 45° Faraday rotator 32 onto a fully reflecting mirror 33. The fully reflecting mirror 33 is positioned to reflect the incident light at an angle which is parallel to the main output pulse of the laser. From the fully reflecting mirror 33 the light is directed through a second polarizer 34 through a counterclockwise 45° Faraday rotator 35 onto a fully reflecting mirror 36 which reflects the incident light at a 90° angle with respect to the incident light path. The light is reflected by mirror 36 onto a similar mirror 37 which reflects the light back into the laser to complete the path of the feedback system. The laser output pulse is therefore controlled by the voltage applied to the Kerr Cell and the light is prevented from travelling in a counterclockwise direction through the system shown by the rotator 35 and the polarizer 34.

FIG. 5 is directed to the system as shown in FIG. 4 which includes a control circuit for the Kerr cell as explained above for the control circuit as illustrated in FIG. 3. The only difference is that the light directed onto the photocathode of the phototube is reflected by a partially reflecting mirror 12 placed in the main output beam. The control circuit is the same as described above for FIG. 3.

FIG. 6 illustrates a schematic drawing of a suitable circuit for the Kerr Cell which may be used for the control circuits as shown in FIGS. 3 and 5. The effect of the control circuits are the same in each instance. The basic feedback system as illustrated in FIG. 6 is the same as shown by illustration in FIG. 3 and includes a comparison circuit with a phototube 24 that receives a light beam from partially reflecting mirror 22 through variable light attenuator 23. The phototube converts incident photons into a positive square wave electrical signal in which the output of the phototube is connected with the anode of a sharp-cutoff tetrode tube 41. The negative square wave output of a multivibrator 26 is connected with the control grid 42 of the tube 41. A B+ source 43 is connected through a resistor 45 to the anode of the tube and also to a capacitor 44 which connects with a suitable amplifier 27 which amplifies an input signal. The output of the amplifier is connected to the Kerr Cell to provide a control voltage for the Kerr Cell.

In operation of the system and control circuit illustrated by FIG. 6, the power for the tubes, etc., is made on. Then the laser is optically pumped in any well-known manner to excite the laser and produce an output pulse. The output pulse is directed onto partially reflecting mirror 12 which transmits the majority of the light pulse and reflects the remainder onto partially reflecting mirror 22 which transmits the majority of the incident light beam and reflects the remainder thereof onto variable light attenuator 23. The light transmitted by mirror 22 is incident on totally reflecting mirror 13 which reflects the light into the Kerr Cell 14. With an applied voltage source of a fixed value on the Kerr Cell no light will be transmitted, therefore an additional voltage source must be applied to the Kerr Cell to permit light to pass through the Kerr Cell. This applied voltage can be from a separate source not shown or from the comparison circuit or a separate applied voltage may be supplemented by the output of the comparison circuit. Explanation will be made with reference to the comparison circuit shown in FIG. 6. The multivibrator 26 is adjusted to produce a desired negative output pulse which is applied to the grid of the sharp-cutoff tetrode tube 41 to cut the tube off, producing a positive change in plate voltage. This is amplified by amplifier 27 and turns the Kerr Cell on. The resulting light reflected from the partially reflecting mirror 22 causes the phototube to conduct and nearly cancel out the decrease in current through the tetrode. The difference in these two current changes produces an error voltage across resistor 45 which will be amplified by the amplifier 27 whose output is connected with the Kerr Cell 14. Assuming now that a voltage is applied to the Kerr Cell through the amplifier, the Kerr Cell will permit the incident light to pass on through the feedback system and is fed back to the laser through the rotator 19, the polarizer 15, polarization rotator 16, and the reflecting mirrors 17 and 18. The light fed back to the laser will pass through the laser material and on passing through the laser will be amplified and become the output pulse of the laser. The output pulse is then transmitted and reflected by mirror 12 as discussed above and will be fed back to the laser through the feedback system as discussed. The comparison circuit acts as a servo system to provide an output pulse of a desired amplitude and duration. By changing the output of the multivibrator the light through the feedback circuit can be controlled by the Kerr Cell due to the applied voltage on the Kerr Cell by the comparison circuit.

It has been determined that for a constant amplitude output of the laser the fractional amount of the light feedback to the laser, B, times the gain, G, through the laser must equal one such that $BG-1=0$. If $BG-1>0$, the amplitude builds up and if $BG-1<0$, then the intensity decreases or dies down. The present feedback laser modulator provides a good control of the laser output to prevent spiked pulsed operation and with proper adjustment the oscillator will operate in a continuous wave.

Obviously many modifications and variations of the present invention are possible in the light of the above teachings. It is therefore to be understood that within the scope of the appended claims the invention may be practiced otherwise than as specifically described.

What is claimed is:

1. An adjustable feedback laser modulator system which comprises a laser, a light source for optically pumping said laser to produce a light output from one end thereof, a light feedback system for feeding a portion of said output back to the end of said laser opposite to that of said output, a light modulator means in said feedback system, and means optically connected with said feedback system to electrically control said modulator means wherein said modulator means controls the output intensity and pulse duration of said laser.

2. An adjustable feedback laser modulator system which comprises a laser, a light source for optically pumping said laser to produce a light output from one end thereof, a light feedback system for feeding a portion of said output back to the end of said laser opposite from that of said output, a light modulator means in said feedback system, and an optical detector means optically connected with said feedback system and electrically connected with said light modulator means to electrically control said modulator wherein said modulator controls the output intensity and pulse duration of said laser.

3. An adjustable feedback laser modulator system which comprises a laser, said laser having input and output ends, a light source for optically pumping said laser to produce a light output, an optical element in axial alignment with said output end of said laser, said optical element being operative to both transmit and reflect incident light from said laser output end, an optical system positioned in optical alignment with said optical element to receive and transmit reflected light from said optical element to said input of said laser, a light modulator means in said optical system and means for controlling said light modulator wherein said light modulator controls the output intensity and pulse duration of said laser.

4. An adjustable feedback laser modulator system which comprises a laser, said laser having input and output ends, a light source for optically pumping said laser to produce a light output, an optical element in axial alignment with said output end of said laser, said optical element operative to both transmit and reflect incident light from said laser output end, an optical system positioned in optical alignment with said optical element in optical alignment to receive and transmit light reflected from said optical element to said input end of said laser, an adjustable light modulator means in said optical system operative to block light passage therethrough and to pass light therethrough and an optical detector electrically connected with said adjustable light modulator to electrically control light passage through said modulator wherein said modulator controls the output intensity and pulse duration of said laser.

5. An adjustable feedback laser modulator system as claimed in claim 4 in which said optical system includes means to permit light passage in only one direction through the system.

6. An adjustable feedback laser modulator system which comprises a laser, said laser having input and output ends, a light source for optically pumping said laser to produce a light output, a partially reflecting mirror positioned in axial alignment with said output end of said laser, an optical system positioned in optical alignment with said partially reflecting mirror to receive light reflected by said mirror and to transmit the reflected light to the input end of said laser, said optical system including a partially reflecting mirror, a light modulator means, optical means for transmitting light in only one direction therethrough, an optical element optically connected with said optical system, said optical element electrically controlling the passage of light through said modulator means wherein said modulator means controls the output intensity and pulse duration of said laser.

7. An adjustable feedback laser modulator system which comprises a laser, said laser having input and output ends, a light source for optically pumping said laser to produce a light output, a partially reflecting mirror positioned in axial alignment with said output end of said laser, an optical light feedback system positioned in optical alignment with said partially reflecting mirror to receive light reflected therefrom and to transmit the reflected light to the input end of said laser, said optical system including a second partially reflecting mirror, a Kerr Cell light modulator and optical means for permitting transmittance of light through said feedback system in only one direction, an electrical control circuit for controlling passage of light through said Kerr Cell, said control circuit including a phototube operative by light received from said second partially reflecting mirror in said feedback system and a comparator to control an electrical supply to said Kerr Cell, said Kerr Cell controlling the passage of light through said optical system to control the output intensity and pulse duration of said laser.

References Cited by the Examiner

UNITED STATES PATENTS 2,836,722  5/1958  Dicke et al. _____ 88—1

FOREIGN PATENTS 1,228,868  2/1959  France.

OTHER REFERENCES

"A Microwave Frequency Standard Employing Optically Pumped Sodium Vapor," by Bell et al., published on page 95 of IRE Transactions on Microwave Theory and Techniques, 1959.

JEWELL H. PEDERSEN, *Primary Examiner.*

SAMUEL BOYD, SAMUEL FEINBERG, *Examiners.*

L. L. HALLACHER, *Assistant Examiner.*